United States Patent [19]
Okada et al.

[11] Patent Number: 5,959,289
[45] Date of Patent: Sep. 28, 1999

[54] CARD AND INFORMATION RECORDING CARD AND METHOD OF USING THE SAME

[75] Inventors: Minoru Okada; Mikio Horiuchi, both of Minato-Ku, Japan

[73] Assignee: Empire Airport Service Co., Ltd., Tokyo, Japan

[21] Appl. No.: 08/798,927

[22] Filed: Feb. 11, 1997

[30]     Foreign Application Priority Data

| Feb. 13, 1996 | [JP] | Japan | 8-025409 |
| Mar. 12, 1996 | [JP] | Japan | 8-054810 |
| Apr. 15, 1996 | [JP] | Japan | 8-092460 |
| Jun. 17, 1996 | [JP] | Japan | 8-155765 |

[51] Int. Cl.$^6$ .................................................. G06F 12/14
[52] U.S. Cl. ........................... 235/487; 235/489; 235/490
[58] Field of Search ................................... 235/489, 487, 235/488, 490, 492, 494, 493; 283/82

[56]               References Cited

U.S. PATENT DOCUMENTS

| 3,585,594 | 6/1971 | Schwend | 235/380 |
| 3,629,835 | 12/1971 | Brown et al. | 235/380 |
| 3,728,521 | 4/1973 | Borough et al. | 350/96.24 |
| 4,187,981 | 2/1980 | Sinko et al. | 235/489 |
| 4,362,930 | 12/1982 | Ehrat | 235/489 |
| 4,671,839 | 6/1987 | Finkel et al. | 235/488 |
| 4,682,794 | 7/1987 | Margolin | 283/82 |
| 4,800,243 | 1/1989 | Osawa et al. | 200/514 |
| 5,594,318 | 1/1997 | Nor et al. | 320/108 |

*Primary Examiner*—Donald Hajec
*Assistant Examiner*—Drew A. Dunn
*Attorney, Agent, or Firm*—Jacobson, Price, Holman & Stern, PLLC

[57]               ABSTRACT

A magnetic card (10) has a base card (11), a magnetic stripe (12) formed on the base card (11), and a plurality of optical fibers (15) extended within the base card (11) substantially perpendicularly to the magnetic stripe (12). The magnetic stripe (12) consists of an arrangement of a plurality of unit magnetic segments (12a) each having a recording capacity of a predetermined number of bits, for example, eleven bits. The optical fibers (15) are assigned to the unit magnetic segments (12a), respectively. A read/write head (23) reads magnetic information from the magnetic stripe (12), an optical read device including a light-emitting device (20) and a light-receiving device (22) read optical information from the optical fibers (15), and a controller (25) examines the magnetic information with reference to the optical information to authenticate the magnetic information.

42 Claims, 12 Drawing Sheets

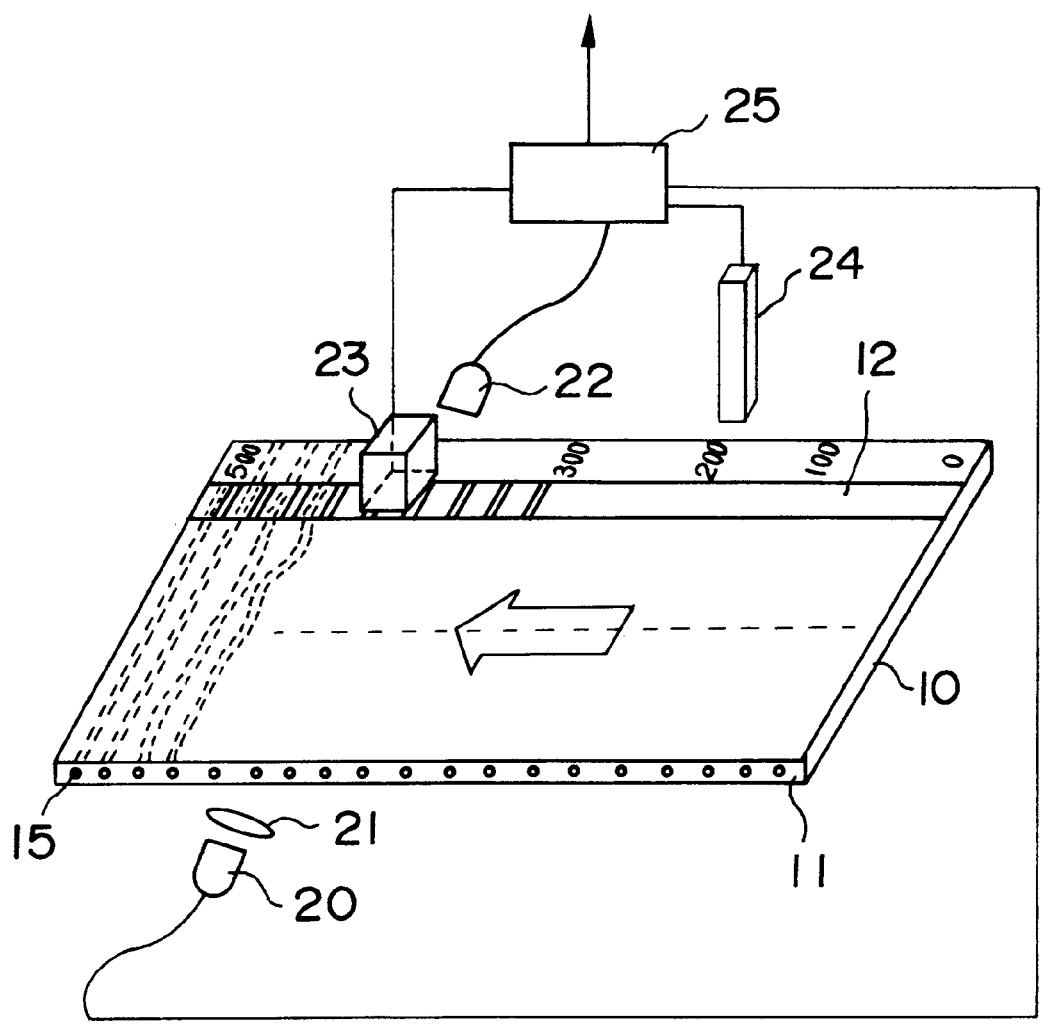
F I G. 1

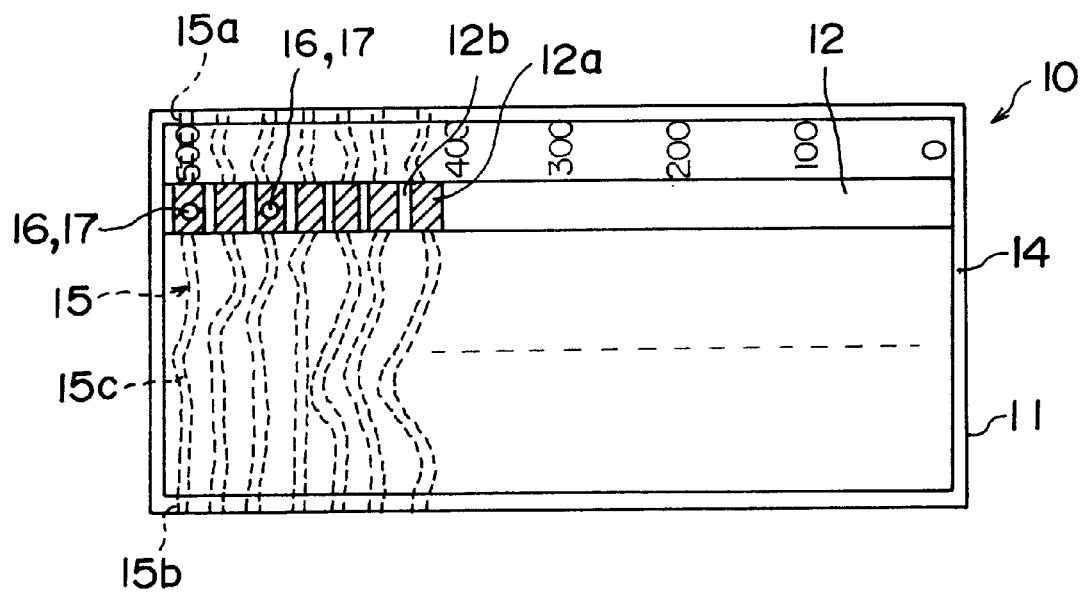
F I G. 2
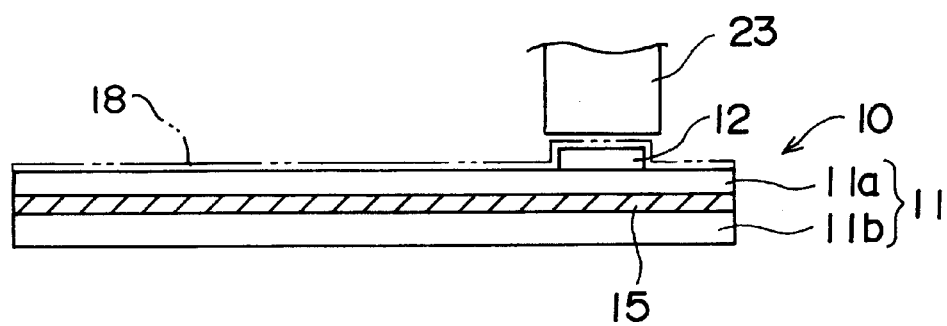
F I G. 3

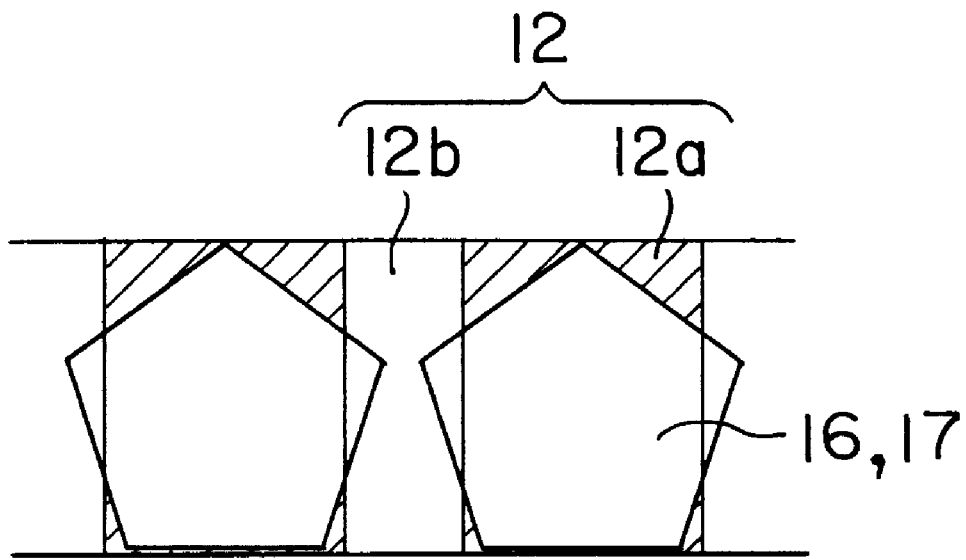
F I G. 5 A
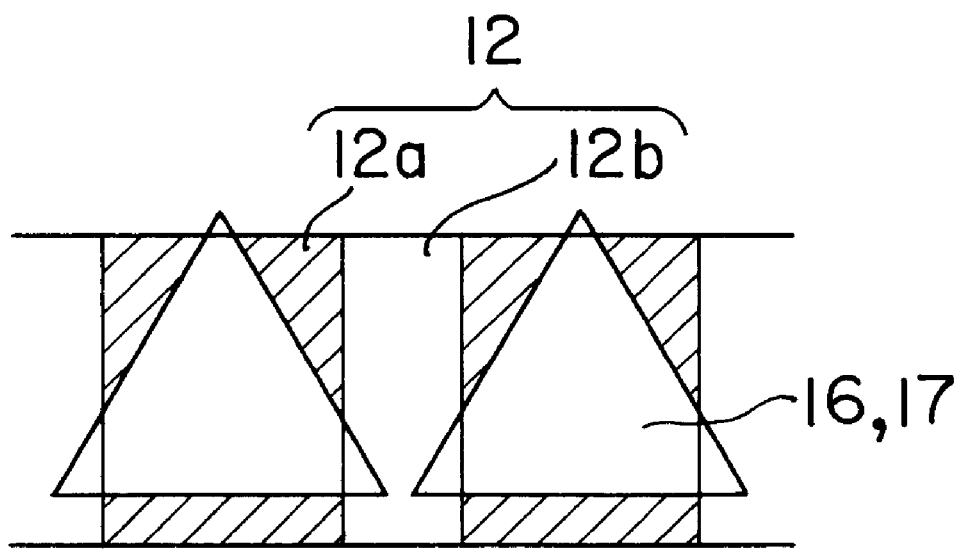
F I G. 5 B

| ROW OF RECORDABLE NUMBERS | 0 | 1 | 2 | 4 | 8 | 16 | 32 | 64 | 128 | 256 | 512 |
|---|---|---|---|---|---|---|---|---|---|---|---|
| | ↓ | ↓ | ↓ | ↓ | ↓ | ↓ | ↓ | ↓ | ↓ | ↓ | ↓ |
| NECESSARY NUMBER OB BITS | 0 | 1 | 2 | 3 | 4 | 5 | 6 | 7 | 8 | 9 | 10 |

FIG. 6A

COMBINATIONS OF THREE BITS
( NUMERAL 1 REPRESENTS HAVING MAGNET, NUMERAL 0 REPRESENTS NOT HAVING MAGNET )

| | | | | |
|---|---|---|---|---|
| 0 | 0 | 0 | ·········· | 0 |
| 0 | 0 | 1 | ·········· | 1 |
| 0 | 1 | 0 | ·········· | 2 |
| 0 | 1 | 1 | ·········· | 3 |
| 1 | 0 | 0 | ·········· | 4 |
| 1 | 0 | 1 | ·········· | 5 |
| 1 | 1 | 0 | ·········· | 6 |
| 1 | 1 | 1 | ·········· | 7 |

FIG. 6B

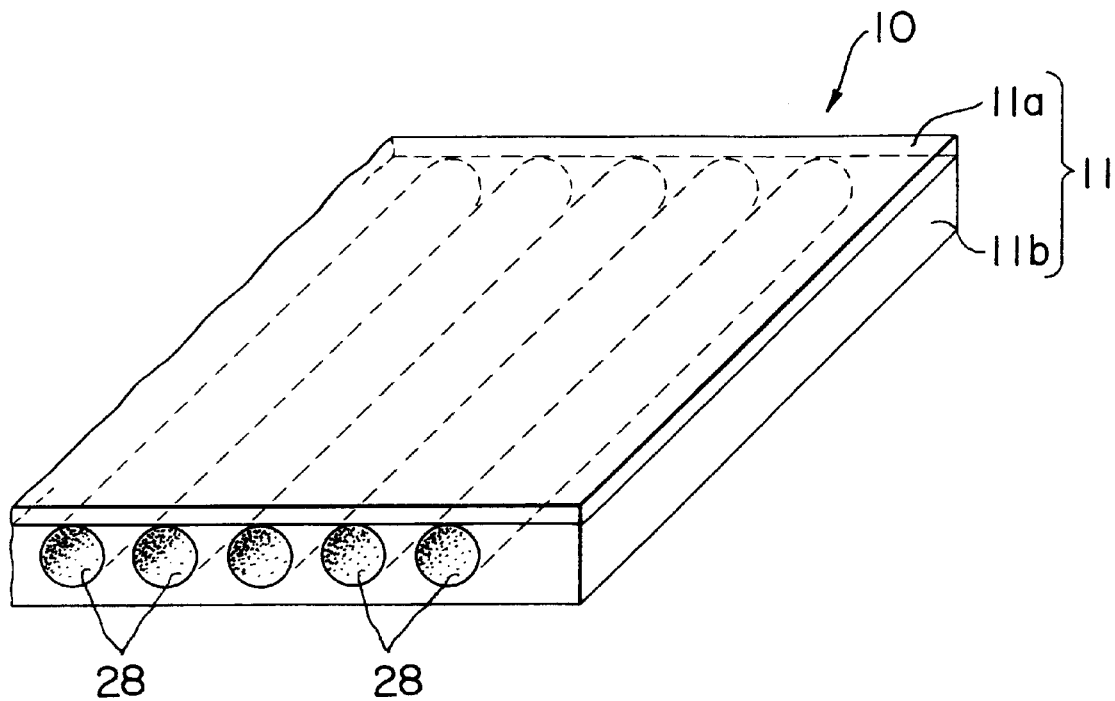
F I G. 8
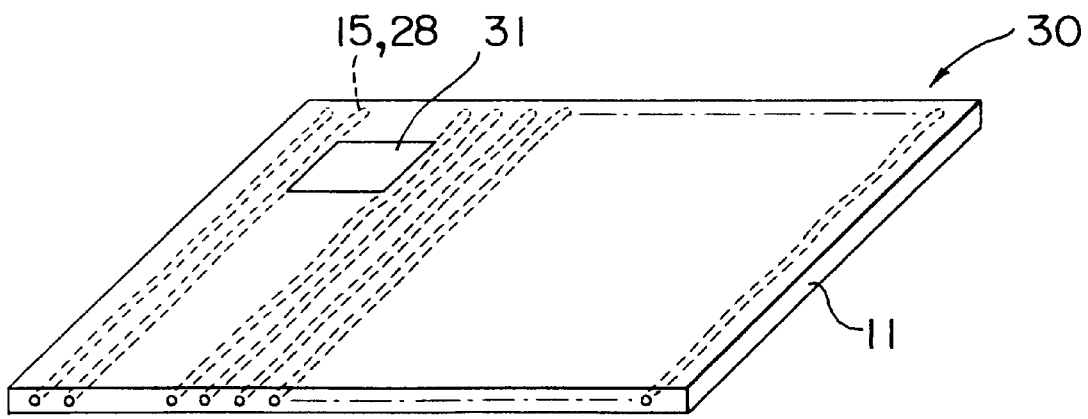
F I G. 9

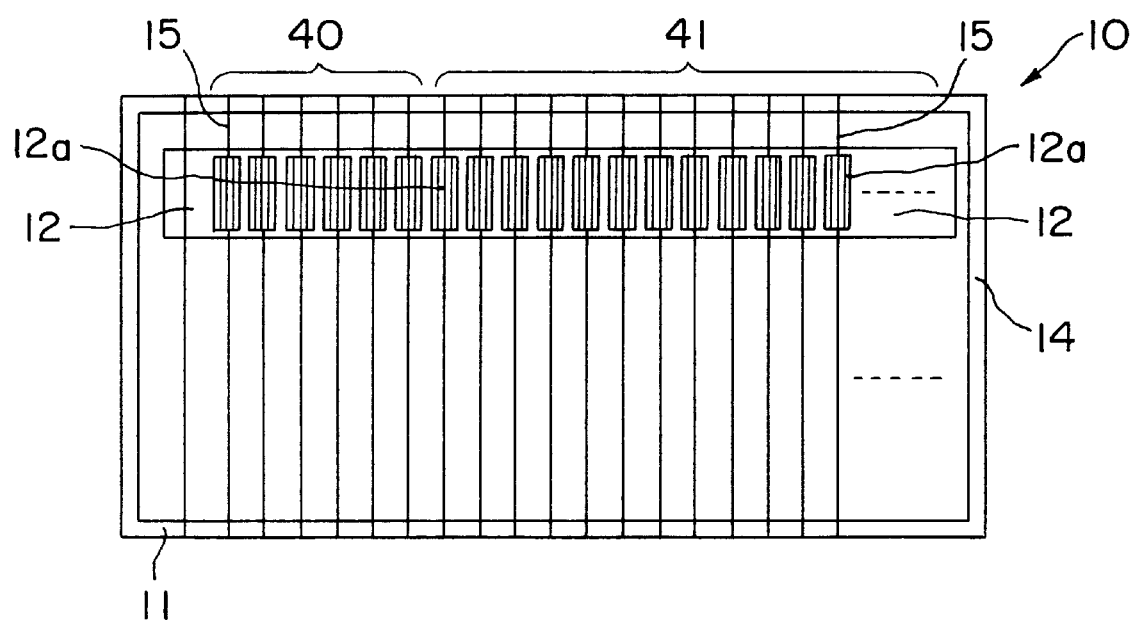
F I G. 10

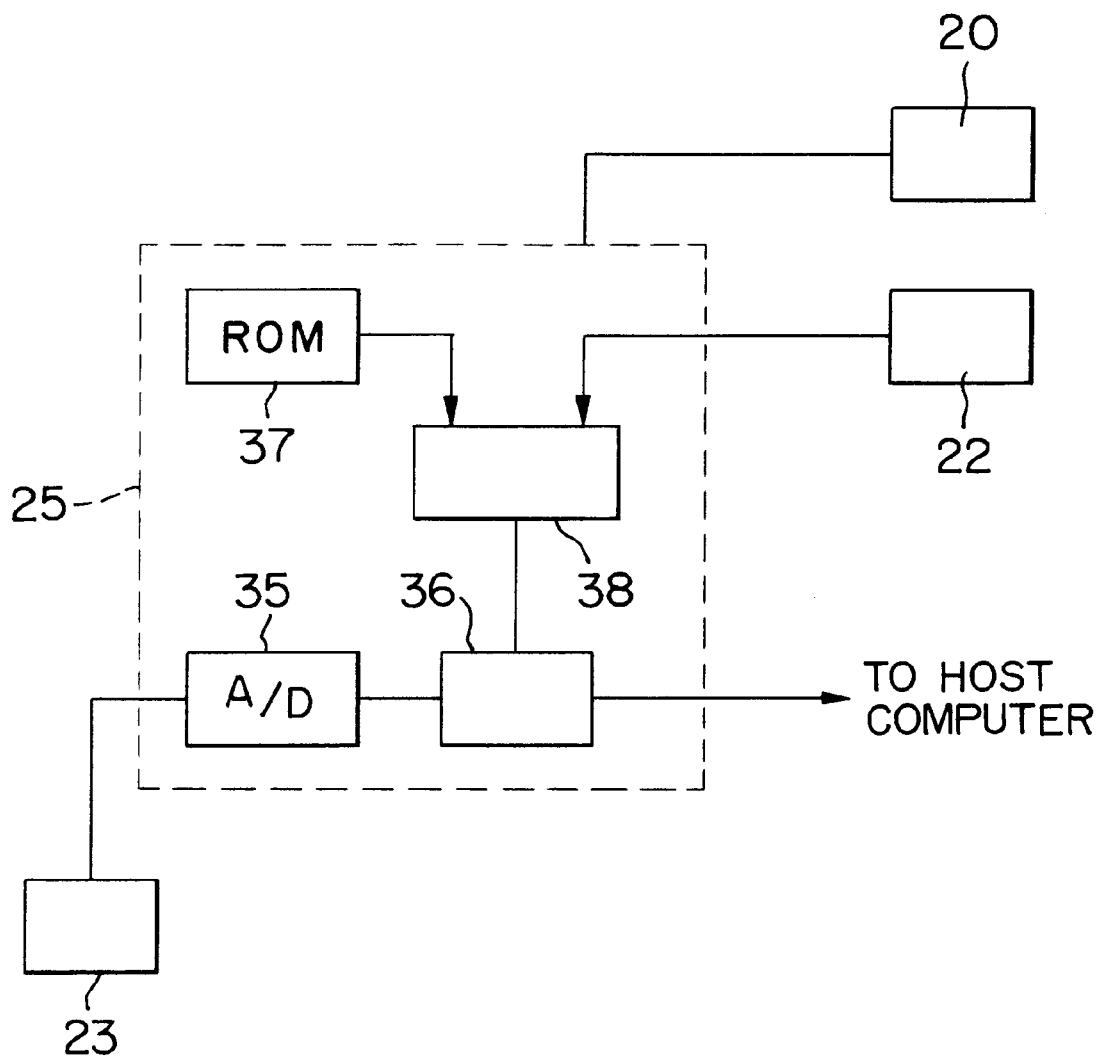
F I G. 11

CARD AND INFORMATION RECORDING CARD AND METHOD OF USING THE SAME

BACKGROUND OF THE INVENTION

1. Field of the Invention

The present invention relates to a card, an information recording card and a method of using those cards.

2. Description of the Related Art

A known magnetic card, i.e., an information recording card, has a rectangular base card, and a magnetic stripe provided by printing or the like on the base card. The magnetic card is used as a prepaid card, such as a calling card (telephone card), a ball renting card to rent balls to play a pinball game or the like.

When using the magnetic card, information magnetically recorded in the magnetic stripe of the magnetic card is read by a read head, and the telephone line is connected for telephone service or balls to play a pinball game are dispensed. A write head rewrites the information recorded in the magnetic stripe every time the magnetic card is used, and a hole is punched in the base card of the magnetic card at a position corresponding to rewritten information. The punched hole is used for authenticating the magnetic information recorded in the magnetic stripe.

Magnetic cards have often been used dishonestly in recent years, in which the information recorded in the magnetic stripe is altered dishonestly. To use the magnetic card dishonestly, the recorded information is altered dishonestly and the punched holes are filled up. Nevertheless, effective measures to cope with such dishonest use of magnetic cards has not been found so far. An IC card formed by embedding an IC module in a base card is another information recording card, which also is considered to be subject to dishonest use.

SUMMARY OF THE INVENTION

The present invention has been made in view of such problems in the conventional information recording cards and it is therefore an object of the present invention to provide a card and an information recording card capable of effectively prohibiting the dishonest alteration of recorded information, and a method of using the card and the information recording card.

According to a first aspect of the present invention, an information recording card comprises a base card, an information recording unit provided in the base card, and a plurality of optical waveguides provided in the base card.

According to a second aspect of the present invention, the information recording unit comprises a magnetic stripe having a plurality of unit magnetic segments each having a predetermined storage capacity, and the plurality of optical waveguides are disposed so as to correspond to the unit magnetic segments, respectively.

According to a third aspect of the present invention, a card comprises a base card, and a plurality of optical waveguides provided in the base card.

According to a fourth aspect of the present invention, a method of using an information recording card comprising a base card, an information recording unit provided in the base card, and a plurality of optical waveguides provided in the base card comprises the steps of reading information recorded in the information recording unit by a read device, reading optical information by projecting a light beam by a light-emitting device on the optical waveguides and receiving the light beam by a light receiving device, and examining the information read from the information recording unit with reference to the optical information to authenticate the same.

According to a fifth aspect of the present invention, the method of using an information recording card further comprises writing new information to the information recording unit, and braking the optical waveguide corresponding to rewritten information.

According to a sixth aspect of the present invention, a method of using an information recording card comprising a base card, an information recording unit formed in the base card, and a plurality of optical waveguides formed in the base card comprises the steps of setting a maximum available amount determining region for a plurality of optical waveguides and determining a maximum available amount by breaking the optical waveguide in the maximum available amount determining region, reading information recorded in the information recording unit by a read device, reading optical information by projecting a light beam on the optical waveguides by a light-emitting device and receiving the light beam by a light receiving device, and comparing the information read from the information recording unit with the maximum available amount indicated by optical information read from the maximum available amount determining region to see if the information read from the information recording unit exceeds the maximum available amount.

According to a seventh aspect of the present invention, the method of using an information recording card further comprises setting data regions in the plurality of optical waveguides and examining the information read by the read device with reference to the optical information to authenticate the same.

According to an eighth aspect of the present invention, a method of using an information recording card comprising a base card, an information recording unit provided in the base card and provided with a magnetic stripe having a plurality of unit magnetic segments each having a recording capacity of a predetermined bits, and a plurality of optical waveguides provided in the base card and disposed at positions corresponding to the unit magnetic segments comprises the steps of reading information recorded in the unit magnetic segment of the magnetic stripe by a read device and reading optical information by projecting a light beam by a light-emitting device on the optical waveguides and receiving the light beam by a light receiving device; and specifying a unit magnetic segment in which the information is recorded on the basis of the read optical information and determining the information stored in the specified unit magnetic segment as the latest information.

According to a ninth aspect of the present invention a method of using an information recording card comprising a base card, an information recording unit formed in the base card and provided with a magnetic stripe having a plurality of unit magnetic segments each having a recording capacity of a predetermined bits, and a plurality of optical waveguides formed in the base card and disposed at positions corresponding to the unit magnetic segments comprises the steps of setting a maximum available amount determining region for the plurality of optical waveguides and determining a maximum available amount by breaking the optical waveguide in the maximum available amount determining region, reading information recorded in the unit magnetic segment of the magnetic stripe by a read device, reading optical information by projecting a light beam on the optical waveguides by a light-emitting device and receiving the light beam by a light receiving device, comparing the information read by the read device with a maximum available amount indicated by optical information read from the maximum available amount determining region to see if the information read by the read device exceeds the maximum available amount.

According to a tenth aspect of the present invention, a method of using an information recording card comprising a base card, an information recording unit provided in the base card and provided with a magnetic stripe having a plurality of unit magnetic segments each having a recording capacity of a predetermined bits, and a plurality of optical waveguides provided in the base card and disposed at positions corresponding to the unit magnetic segments comprises the steps of dividing the plurality of optical waveguides into those included in a maximum available amount determining region and those included in a data region, and determining a maximum available amount by breaking the optical waveguide included in the maximum available amount determining region, reading information recorded in the unit magnetic segment of the magnetic stripe by a read device, and reading optical information by projecting a light beam on the optical waveguides by a light-emitting device and receiving the light beam by a light receiving device, specifying the unit magnetic segment in which the information is recorded on the basis of optical information obtained from the data region and determining the information recorded in the specified unit magnetic segments as the latest information, and comparing the latest information with a maximum available amount indicated by optical information read from the maximum available amount determining region to see if the latest information exceeds the maximum available amount.

According to an eleventh aspect of the present invention, a method of using a card comprising a base card and a plurality of optical waveguides provided in the base card comprises the steps of reading optical information by projecting a light beam on the optical waveguide by a light-emitting device and receiving the light beam by a light receiving device, and breaking a desired optical waveguide.

According to a twelfth aspect of the present invention, a read system for reading information from an information recording card comprising a base card, an information recording unit formed in the base card, and a plurality optical waveguides including at least those included in a maximum available amount determining region comprises a light-emitting device for projecting a light beam on the optical waveguides included in the maximum available amount determining region, a light receiving device for receiving the light beam to read optical information from the maximum available amount determining region, a read device for reading information recorded in the information recording unit, and a controller connected to the light-emitting device, the light receiving device and the read device, and comprising a ROM storing a unit maximum available amount, a maximum available amount calculating unit that determines a maximum available amount on the basis of the optical information provided by the light receiving device and the unit maximum available amount read from the ROM, and a comparing unit which compares a maximum available amount calculated by the maximum available amount calculating unit and the information read by the read device.

According to a thirteenth aspect of the present invention, a magnetic card comprises a rectangular base card, a magnetic stripe provided in the base card, and a plurality of elongate electro-conductive rubber lines provided in the base card so as to extend perpendicularly to the magnetic stripe.

According to a fourteenth aspect of the present invention, the magnetic stripe of the magnetic card is provided by arranging a plurality of unit magnetic segments having a recording capacity of a predetermined number of bits, and the conductive rubber lines are disposed so as to correspond to the unit magnetic segments.

According to a fifteenth aspect of the present invention, a card comprises a rectangular base card, and a plurality of elongate conductive rubber lines.

According to a sixteenth aspect of the present invention, a method of using a magnetic card comprising a rectangular base card, a magnetic stripe formed on the base card, and a plurality of elongate conductive rubber lines formed in the base card so as to extend perpendicularly to the magnetic stripe comprises the steps of reading magnetic information recorded in the magnetic stripe by a read head and reading electrical information by supplying a current through a pair of contact units to the conductive rubber lines, examining the read magnetic information with reference to the read electrical information to authenticate the same, and writing new magnetic information to the magnetic stripe by a write head and forming a hole penetrating through the base card and the conductive rubber line corresponding to the new magnetic information.

According to a seventeenth aspect of the present invention, a method of using a magnetic card comprising a rectangular base card, a magnetic stripe provided in the base card and having a plurality of unit magnetic segments having a recording capacity of a predetermined number of bits, and a plurality of elongate conductive rubber lines formed in the base card so as to extend perpendicularly to the magnetic stripe and disposed so as to correspond to the unit magnetic segments comprises the steps of reading magnetic information recorded in the unit magnetic segments of the magnetic stripe by a read head and supplying a current through a pair of contact units to the conductive rubber lines to read electrical information, specifying a unit magnetic segment in which the magnetic information is recorded from the read electrical information and determining the magnetic information recorded in the specified unit magnetic segment as the latest magnetic information, writing the magnetic information to the unit magnetic segment of the magnetic stripe corresponding to the latest magnetic information by a write head to update the unit magnetic segment, and writing new electrical information by forming a hole through the base card and the conductive rubber stripe of the unit magnetic segment separated by a predetermined number of unit magnetic segments from the updated unit magnetic segment.

According to an eighteenth aspect of the present invention, a method of using a card comprising a rectangular base card and a plurality of elongate conductive rubber lines extended in the base card comprises steps of supplying a current through a pair of contact units to the conductive rubber lines to read electrical information, and writing the latest electrical information by forming a hole through the base card and a desired one of the conductive rubber lines.

The magnetic cards and the cards in accordance with the present invention are capable of effectively preventing the dishonest use thereof.

BRIEF DESCRIPTION OF THE DRAWINGS

The above and other objects, features and advantages of the present invention will become more apparent from the following description taken in connection with the accompanying drawings, in which:

FIG. 1 is a perspective view of a magnetic card in a first embodiment according to the present invention;

FIG. 2 is a plan view of the magnetic card of FIG. 1;

FIG. 3 is a sectional side view of the magnetic card of FIG. 1;

FIG. 5A is a pictorial view of modifications of through holes and grooves formed in a magnetic stripe;

FIG. 5B is a pictorial view of further modifications of through holes and grooves formed in a magnetic stripe;

FIG. 6A is a table showing the numbers of bits of a unit magnetic segment;

FIG. 6B is a table showing bit combinations expressed by three bits;

FIG. 8 is a perspective view of a modification of the magnetic card of FIG. 7;

FIG. 9 is a perspective view of another modification of the magnetic card of FIG. 7;

FIG. 10 is a plan view of a magnetic card in a third embodiment according to the present invention;

FIG. 11 is a block diagram of an information read system for reading information from the magnetic card in the third embodiment.

DETAILED DESCRIPTION OF THE PREFERRED EMBODIMENTS

First Embodiment

Figure 4A:
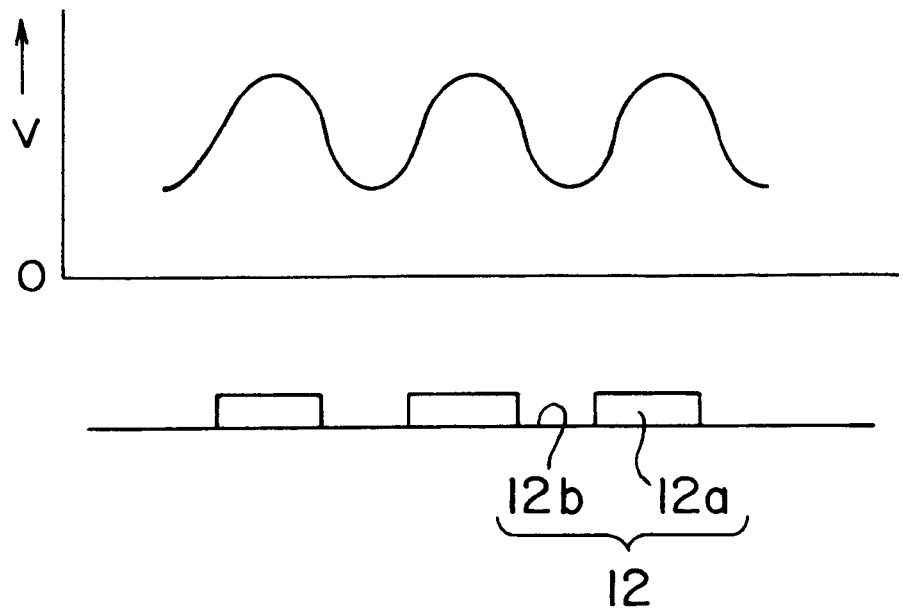
FIG. 4A is a graph showing the waveform of a voltage signal representing magnetic information recorded in a magnetic stripe.

An information recording card in accordance with the present invention is a magnetic card or an IC card. A magnetic card in a first embodiment according to the present invention will be described with reference to FIGS. 1 to 6B.

Referring to FIGS. 1 to 3, a magnetic card 10 has a rectangular base card 11 formed by putting together a pair of plastic base plates 11a and 11b (FIG. 3), a magnetic stripe 12 printed on the base card 11 so as to extend along a longitudinal direction of the base card 11, and a plurality of optical fibers 15, i.e., optical waveguides, held between the pair of base plates 11a and 11b and extending along a direction perpendicular to the magnetic stripes 12. A colored protective film 18 may be applied to the base card 11 so as to cover the entire surface of the base card 11 including the magnetic stripe 12. The base card 11 is formed by putting the base plates 11a and 11b one on top of the other and making the same stick to each other by vacuum and has a peripheral frame 14 formed by adhesively bonding together the corresponding peripheral portions of the base plates 11a and 11b. As shown in FIG. 2, the magnetic stripe 12 has a plurality of unit magnetic segments 12a having a recording capacity of a predetermined number of bits, and spaced from each other by gaps 12b.

When the magnetic card 10 is a 50,000-yen prepaid card, such as a prepaid card for renting balls which are worth 50,000 yens to play a pinball game, the magnetic stripe 12 has 500 unit magnetic segments 12a each being worth 100 yens. Since 256 (nine bits)<500<512 (ten bits) as shown in FIG. 6A, each unit magnetic segment 12a is able to record 500 units when each unit magnetic segment has a recording capacity of nine bits. The relation between the number of bits and the number of recordable units will be described with reference to FIG. 6B. As shown in FIG. 6B, numerical values from 0 to 7 can be expressed by combinations of three bits. In this embodiment, each unit magnetic segment 12a has a storage capacity of eleven bits because one start bit indicating the start of magnetic information and a stop bit indicating the end of the magnetic information are necessary to write the magnetic information of nine bits to each unit magnetic segment 12a. Each unit magnetic segment 12a corresponds to one unit and hence the magnetic stripe 12 has the 500 unit magnetic segments 12a.

Referring to FIG. 2, the 500 optical fibers 15 correspond to the 500 unit magnetic segments 12a, respectively. Each optical fiber 15 extends perpendicularly to the magnetic stripe 12 and substantially through the central portion of the corresponding unit magnetic segment 12a. Each optical fiber 15 has opposite end portions 15a and 15b fastened to the peripheral frame 14 of the base card 11, and a middle portion 15c between the opposite end portions 15a and 15b held between and not fastened to the pair of base plates 11a and 11b of the base card 11. If the peripheral frame 14 of the base card 11 is cut off, the base plates 11a and 11b, and the optical fibers 15 come apart. The opposite end portions 15a and 15b of the optical fibers 15, fastened to the peripheral frame 14 are arranged at regular intervals, while the middle portions 15c of the optical fibers 15 meander. Therefore, when a specified portion of the base card 11, including the unit magnetic segment 12a is punched, it is very difficult to connect the disconnected optical fiber 15 by fitting a plugging member having an optical fiber 15 in a hole formed when the specified portion of the base card 11 is punched. Each optical fiber 15 is 0.3 mm in diameter, and the end surfaces of the opposite ends 15a and 15b of each optical fiber 15 are exposed outside in the edges of the base card 11 and are mirror-finished to receive and send out light efficiently. Numerals such as 0, 10, 200, 300, 400, 500 and such are marked on the surface of the base card 11 at positions beside the magnetic stripe 12 and corresponding to the unit magnetic segments 12a at intervals corresponding to 100 units to enable the visual recognition of the remaining value of the magnetic card 10.

A read/write apparatus for reading magnetic information and optical information from and writing magnetic information and optical information to the magnetic card 10 will be described with reference to FIG. 1. Referring to FIG. 1, the magnetic card 10 is advanced in the direction of the arrow L. A read/write head 23 included in a read/write apparatus reads information from the magnetic stripe 12 and write information to the magnetic stripe 12 to update the magnetic stripe 12. The read/write head 23 is connected to a controller 25 connected to a host computer, not shown. A light emitting device (light-emitting device) 20 provided with a semiconductor laser or a light-emitting diode is disposed on one side of a card path along which the magnetic card 10 advances. A light beam emitted by the light emitting device 20 is condensed by a condenser lens 21 in a narrow light beam, the narrow light beam travels through each optical fiber 15. A light receiving device (light sensor) 22 is disposed on the other side of the card path to receive the light beam traveled through each optical fiber 15. The light emitting device 20 and the light receiving device are connected to the controller 25.

A punching device 24 is disposed above a position in the card path corresponding to the magnetic stripe 12 of the magnetic card 10 to punch a through hole 16 in corresponding portions of the base card 11, the unit magnetic segment 12a and the optical fiber 15. The punching device 24 may compress light receiving device of the card base 11, the unit magnetic segment 12a and the optical fiber 15 to form a recess 17 instead of the through hole 16. The through hole 16 may be formed by melting portions of the base card 11, the unit magnetic segment 12a and the optical fiber 15. The quantity of light transmitted through the optical fiber 15 can be reduced by breaking the portion of the optical fiber 15 by forming the through hole 16 or the recess 17, which will be described later.

A method of using the magnetic card 10 as applied to a prepaid card for renting balls to play a pinball game will be described hereinafter. First, magnetic information representing 50,000 yens, i.e., 500 units each of 100 yens, is recorded in the leftmost unit magnetic segment 12a of the magnetic stripe 12 of the magnetic card 10 as viewed in FIG. 2. Suppose that balls which are worth 100 yens are rented. The magnetic card 10 is inserted in a card read system. While the magnetic card 10 is advancing along a card path in the direction of the arrow L (FIG. 1), the read/write head 23 reads the magnetic information recorded in the magnetic stripe 12 and sends a signal representing the read magnetic information to the controller 25. Meanwhile, the light beam emitted by the light emitting device 20 and condensed by the condenser lens 21 travels through the optical fibers 15, the light receiving device 22 receives the light beam from each optical fiber 15 and sends a signal representing optical information provided by the light beam to the controller 25. The controller 25 examines the magnetic information with reference to the optical information to authenticate the same, specifies the leftmost unit magnetic segment 12a storing the magnetic information on the basis of the magnetic information and the optical information indicating that all the optical fibers 15 are continuous, and determines that the magnetic information read from the leftmost unit magnetic segment 12 and representing 500 units is the latest magnetic information.

When the magnetic card 10 is used to rent balls for a pinball game which are worth 100 yens (one unit), the magnetic card 10 is moved in the reverse direction, i.e., a direction opposite the direction of the arrow L, and new magnetic information representing 499 units (=500−1) is recorded in a unit magnetic segment 12a corresponding to 499 units, i.e., the second unit magnetic segment 12a from the left as viewed in FIG. 2.

The operation of the card read system for the foregoing procedure will be described hereinafter. The controller 25 drives the punching device 24 to punch out (pierce) a through hole 16 in the magnetic card 10 at a position corresponding to the next unit magnetic segment 12a on the left side of the unit magnetic segment 12a corresponding to 499 units, i.e., the leftmost unit magnetic segment 12a (FIG. 2) to punch a through hole 16 in corresponding portions of the base card 11, the unit magnetic segment 12a and the optical fiber 15. Then, the controller 25 drives the read/write head 23 to record new magnetic information representing 499 units in the unit magnetic segment 12a corresponding to 499 units. Thus, the magnetic information recorded in the magnetic card 10 is updated.

Suppose that additional balls which are worth 200 yens are rented. The magnetic card 10 is inserted in a card read system. While the magnetic card 10 is advancing along a card path in the direction of the arrow L (FIG. 1), the read/write head 23 reads the magnetic information recorded in the magnetic stripe 12 and sends a signal representing the read magnetic information to the controller 25. Meanwhile, the light beam emitted by the light emitting device 20 and condensed by the condenser lens 21 travels through the optical fibers 15, the light receiving device 22 receives the light beam from each optical fiber 15 and sends a signal representing optical information provided by the light beam to the controller 25.

Since a portion of the optical fiber 15 extended across the leftmost unit magnetic segment 12a (FIG. 2) has been broken by the through hole 16, the quantity of light transmitted through the optical fiber 15 changes. The controller 25 detects the breakage of the optical fiber 15 extended across the leftmost unit magnetic segment 12a from a change in the quantity of light transmitted through the same optical fiber 15. Upon the detection of the breakage of the optical fiber 15 extended across the leftmost unit magnetic segment 15a, the controller 25 specifies the second unit magnetic segment 12a from the left as a unit magnetic segment in which the magnetic information is recorded, and recognizes the magnetic information recorded in the specified unit magnetic segment 12a and representing 499 units as the latest magnetic information.

When the magnetic card 10 is used to rent balls which are worth 200 yens (two units), the magnetic card 10 is moved in the reverse direction, i.e., a direction opposite the direction of the arrow L, and new magnetic information representing 497 units (=499−2) is recorded in a unit magnetic segment 12a corresponding to 297 units, i.e., the fourth unit magnetic segment 12a from the left as viewed in FIG. 2.

The controller 25 drives the punching device 24 to punch a through hole 16 in the magnetic card 10 at a position corresponding to the next unit magnetic segment 12a on the left side of the unit magnetic segment 12a corresponding to 497 units, i.e., the third unit magnetic segment 12a from the left (FIG. 2) to punch out a through hole 16 in corresponding portions of the base card 11, the unit magnetic segment 12a and the optical fiber 15. Then, the controller 25 drives the read/write head 23 to record new magnetic information representing 497 units in the unit magnetic segment 12a corresponding to 497 units. Thus, the magnetic information recorded in the magnetic card 10 is updated.

The same procedure is repeated, every time the magnetic card 10 is used for renting balls, to read magnetic information from the unit magnetic segment 12a, to read optical information provided by the optical fibers 15, a through hole 16 is punched out in corresponding portions of the base card 11, the unit magnetic segment 12a and the optical fiber 15, and to update the magnetic information recorded in the magnetic card 10 by recording the latest magnetic information in the relevant unit magnetic unit 12a.

The punching device 24 may compress (deform) respective corresponding portions of the unit magnetic segment 12a, the base card 11 and the optical fiber 15 to form a recess 17 instead of punching out the through hole 16 in the same portions. If a portion of the optical fiber 15 is compressed, the same portion is broken or deformed. Consequently, the quantity of light transmitted through the optical fiber 15 changes, and the controller 25 detects a change in the quantity of light transmitted through the optical fiber 15. In the foregoing embodiment, the new magnetic information is recorded in the unit magnetic segment 12a after the through hole 16 has been formed in the next unit magnetic segment 12a on the left side of the unit magnetic segment 12a in which the new magnetic information is recorded. However, the through hole 16 may be formed after the new magnetic information has been recorded.

The shape of the through hole 16 or the recess 17 to be formed by the punching device 24 may be circular (FIG. 2), pentagonal (FIG. 5A) or triangular (FIG. 5B). If a pentagonal or triangular through hole 16 is formed by the punching device 24, it is very difficult to connect the broken optical fiber 15 properly by fitting a plugging chip provided with an optical fiber in the through hole 16.

Dishonest methods of using the magnetic card 10 and the capability of a method of using the magnetic card 10 in rejecting the dishonest use of the magnetic card 10 will be described hereinafter.

Figure 4B:
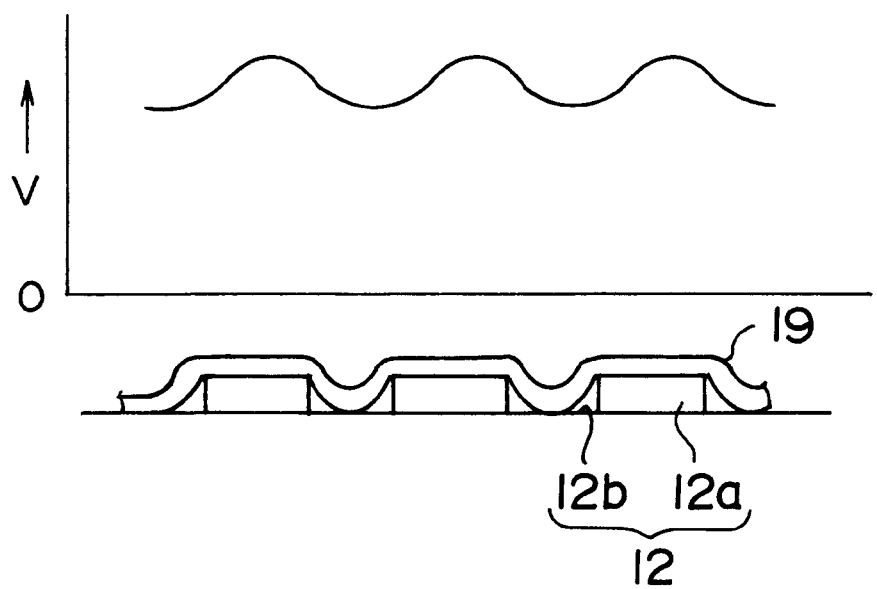
FIG. 4B is a graph showing the waveform of a voltage signal representing magnetic information recorded in a magnetic stripe when a magnetic tape is applied to the magnetic stripe.

A possible dishonest method of using the magnetic card 10 attaches a magnetic tape 19 adhesively to a portion of the magnetic card 10 corresponding to the magnetic stripe 12 and records new magnetic information in the magnetic tape 19 as shown in FIGS. 4A and 4B. In the magnetic card 10 of the present invention, the magnetic stripe 12 has the unit magnetic segments 12a and the gaps 12b. Therefore, a voltage signal representing the magnetic information read from the magnetic stripe 12 has a waveform having elevated sections corresponding to the unit magnetic segments 12a, and low sections corresponding to white noise generated by the gaps 12b as shown in FIG. 4A. If the magnetic tape 19 is attached adhesively to the portion of the magnetic card 10 corresponding to the magnetic stripe 12, a voltage signal representing the magnetic information read from the magnetic tape 12 has low sections corresponding to white noise generated by the gaps 12b, and elevated sections corresponding to the unit magnetic segments 12a and having a curved shape more gentle than that of the elevated sections corresponding to the unit magnetic segments 12a of the magnetic card 10 to which the magnetic tape 19 is not attached. Therefore, the magnetic tape 19 dishonestly attached to the magnetic card 10 can be detected through the detection of a change in the waveform of the voltage signal representing the magnetic information. The gaps 12b can be concealed by coating the surface of the base card 11 entirely with the colored protective film 18.

Another possible dishonest method of using the magnetic card 10 punches a hole in a portion of the base card 11 lying inside the peripheral frame 14 and including the through hole 16 or the recess 17, and fits a plugging chip including an optical fiber in the hole. However, if a portion of the base card 11 is punched, the optical fiber 15 held between the base plates 11a and 11b is dislocated because the base card 11 is formed by putting the base plates 11a and 11b one on top of the other and making the same stick to each other by vacuum. Furthermore, since the middle portion 15c of the optical fiber 15 between the opposite end portions 15a and 15b meander, it is very difficult to fit the plugging chip in the punched hole with the opposite ends of the optical fiber included therein coinciding with the broken ends of the optical fiber 15 of the magnetic card 10.

Thus, the magnetic card 10 in the first embodiment is capable of effectively preventing the dishonest use thereof and the dishonest alteration of the magnetic information recorded therein.

Second Embodiment

A magnetic card 10 in a second embodiment according to the present invention will be described with reference to FIG. 7, in which parts like or corresponding to those of the magnetic card 10 in the first embodiment shown in FIGS. 1 to 6B are designated by the same reference characters and the description thereof will be omitted. The magnetic card 10 in the second embodiment differs from the magnetic card 10 in the first embodiment only in the construction of a magnetic stripe 12 employed therein.

Figure 7:
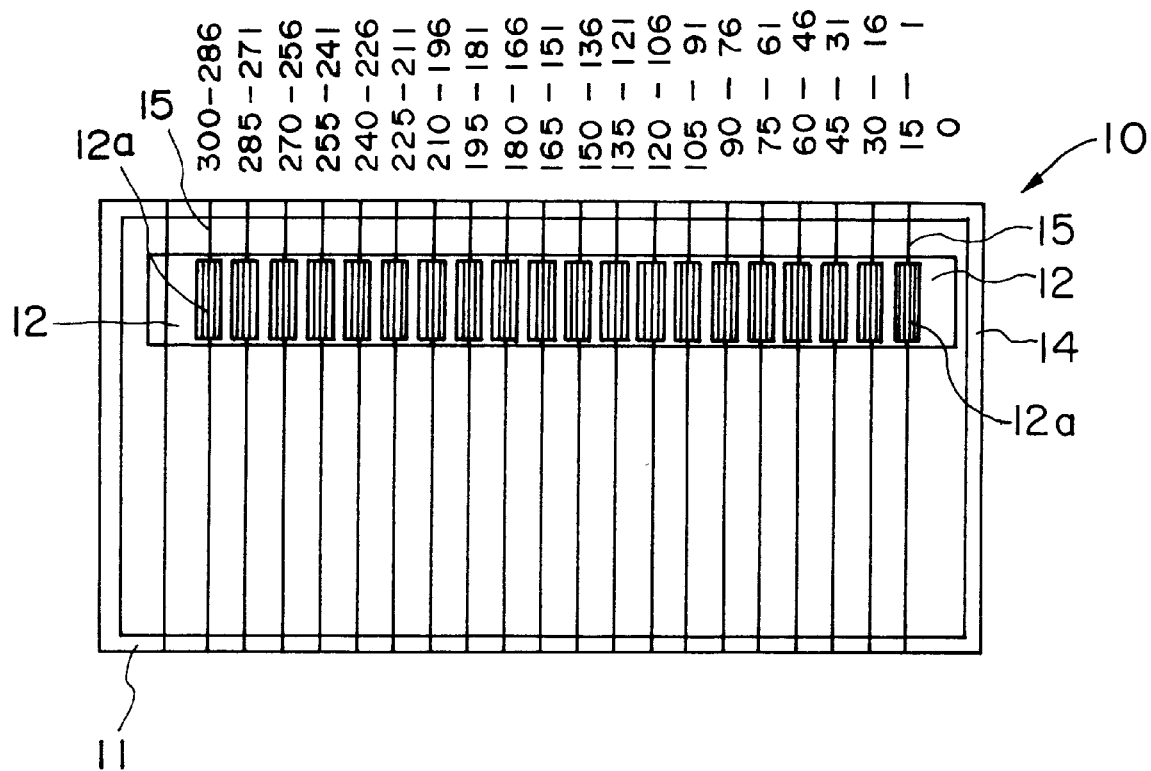
FIG. 7 is a plan view of a magnetic card in a second embodiment according to the present invention.

Referring to FIG. 7, the magnetic card 10 is a 30,000-yen prepaid card for renting balls to play a pinball game. If one unit corresponds to 100 yens, 30,000 yens is represented by 300 units. Since 256 (nine bits)<300<512 (ten bits), magnetic information representing 300 units can be recorded in each unit magnetic segment 12a when the unit magnetic segment 12a has a recording capacity of nine bits. In the second embodiment, each unit magnetic segment 12a has a start bit indicating the start of the magnetic information and a stop bit indicating the end of the magnetic information, and hence each unit magnetic unit 12a has a storage capacity of eleven bits. In the second embodiment, fifteen units are assigned to each unit magnetic segments 12a and hence the magnetic card 10 is provided with twenty unit magnetic segments 12a (300/15=20).

As shown in FIG. 7, the magnetic card 10 is provided with twenty-one optical fibers 15; the twenty optical fibers 15 are arranged so as to extend across the twenty unit magnetic segments 12a, respectively, and the one optical fiber 15 is disposed on the left side of the leftmost unit magnetic segment 12a, as viewed in FIG. 7.

When using the magnetic card 10, magnetic information representing 300 units which are worth 30,000 yens is recorded in the leftmost unit magnetic segment 12a. When some units of the magnetic card 10 are used and the number of remaining units is in the range of 286 to 299, magnetic information representing the remaining units is recorded in the leftmost unit magnetic segment 12a. When the further units of the magnetic card 10 are used and the number of the remaining units is in the range of 241 to 255, magnetic information representing the remaining units is recorded in the fourth unit magnetic segment 12a from the left, and portions of the third unit magnetic segment 12a from the left on the left side of the fourth unit magnetic segment 12a and the optical fiber 15 are broken.

Modifications

The magnetic cards 10 shown in FIGS. 1 to 7 employ the optical fibers 15 as the optical waveguides. A magnetic card 10 shown in FIG. 8 in a modification of the foregoing magnetic cards 10 has a rectangular base card 11 consisting of a pair of base plates 11a and 11b, grooves 28 forming light paths for a light beam are formed in the base plate 11b and are covered with the other base plate 11a. A light beam travels from one side of the other side of the magnetic card 10 through the groove 28. If a through hole 16 or a recess 17 is formed in a portion of the magnetic card 10 corresponding to the groove 28 to break the groove 28, the quantity of the light beam that travels through the groove 28 is reduced.

Although the information recording cards in the foregoing embodiments shown in FIGS. 1 to 8 are magnetic cards 10, the information recording card in accordance with the present invention may be an IC card 30 as shown in FIG. 9. As shown in FIG. 9, the IC card 30 has a rectangular base card 11 provided with optical fibers 15 or grooves 28, and an IC module 31 embedded in the base card 11. The IC module 31 of the IC card 30, similarly to the magnetic stripe 12 of the magnetic card 10, serves as an information recording unit. Information is written to and read from the IC module 31 and the information stored in the IC module 31 can be updated.

Third Embodiment

A magnetic card 10 in a third embodiment according to the present invention will be described with reference to FIGS. 10 and 11, in which parts like or corresponding to those of the first embodiment shown in FIGS. 1 to 6B and the second embodiment shown in FIG. 7 are designated by the same reference characters and the description thereof will be omitted.

The magnetic card 10 in the third embodiment is provided with optical fibers 15 which are divided into those arranged in a maximum available amount determining region and those arranged in a data region. This magnetic card 10 is the same in other respects as the magnetic card 10 in the second embodiment shown in FIG. 7.

Referring to FIG. 10, the magnetic card 10 has a base card 11 having a peripheral frame 14, a magnetic stripe 12 having a plurality of unit magnetic segments 12a, and the optical fibers 15 respectively corresponding to the unit magnetic segments 12a. Some of the plurality of optical fibers 15 are assigned to a maximum available amount determining region 40, and the rest are assigned to a data region 41 in which the information recorded in the unit magnetic segment 12a of the magnetic stripe 12 is subjected to authentication. The unit magnetic segments 12a in the maximum available amount determining region 40 are not necessarily indispensable, and the maximum available amount determining region 40 may be provided with only the optical fibers 15.

When using the magnetic card 10, optical information representing a maximum available amount is recorded in the plurality of optical fibers 15 in the maximum available amount determining region 40. In this embodiment, the six optical fibers 15 are arranged in the maximum available amount determining region and hence one of sixty-four (=$2^6$) maximum available amounts can be determined by breaking one of the six optical fibers 15. For example, if optical information "1" is recorded in the six optical fibers 15, (Reference unit "1")+(Optical information "1")="2" is recorded. If a unit maximum amount is 500 yens, a maximum available amount is 500×2=1000 yens. If optical information "9" is recorded in the six optical fibers 15, (Reference unit "1")+(Optical information "9")="10" is recorded and a maximum available amount is 500×10=5,000 yens. If optical information "64" is recorded in the six optical fibers 15, (Reference unit "1")+(Optical information "64")="65" is recorded and hence a maximum available amount is 500×65=32,500 yens.

Suppose that optical information "1" is recorded in the six optical fibers 15 to determine a maximum available amount of 1000 yens. Since the unit magnetic segment 12a has a recording capacity of eleven bits including one start bit and one stop bit, the unit magnetic segment 12a has nine bits available for information recording, and is capable of storing 512 units at the greatest. If one unit is equal to 100 yens, information representing 51,200 yens at the greatest can be recorded in the unit magnetic segment 12a. The unit magnetic segments 12a of the magnetic card 10 are formed for every five units (500 yens) because the unit maximum amount is 500 yens. Therefore, the number of the unit magnetic segments 12a (the number of the optical fibers 15) in the data region 41 corresponds to the maximum optical information of "64" in the maximum available amount determining region 40 and is equal to 64=(Reference unit "1")+(optical information "64").

After determining the maximum available amount of 1000 yens by breaking the optical fibers 15 of the maximum available amount determining region 40, the unit magnetic segments 12a excluding the two unit magnetic segments 12a from the left of the data region 41 are broken to prevent the dishonest recording of magnetic information. All the unit magnetic segments of the data region 41 need not necessarily be broken and may be kept unbroken. Meanwhile, magnetic information representing ten units (1000 yens) is recorded in the leftmost unit magnetic segment 12a of the data region 41.

Suppose that 500 yens of the magnetic card 10 has been used and the remainder is five units (500 yens). Then, magnetic information representing five units is recorded in the second unit magnetic segment 12a from the left of the data region and the left most unit magnetic segment 12a of the data region is broken.

Such a mode of use of the magnetic card 10 will be described in further detail. As shown in FIG. 1, a read/write head 23 reads the magnetic information recorded in the magnetic stripe 12 having the unit magnetic segments 12a of the magnetic card 10, and the read/write head 23 sends a signal representing the read magnetic information to a controller 25. Meanwhile, a light beam emitted by a light emitting device 20 and condensed by a condenser lens 21 travels through the optical fibers 15, and a light receiving device 22 receives the light beam transmitted through the optical fibers 15 and sends optical information to the controller 25. The controller 25 specifies the unit magnetic segment 12a in which information is recorded on the basis of the optical information provided by the optical fibers 15 included in the data region 41, and determines the information recorded in the specified unit magnetic segment 12a as the latest information. For example, if information representing 500 yens is recorded in the second unit magnetic segment 12a from the left of the data region 41 and the first unit magnetic segment 12a from the left, i.e., the leftmost unit magnetic segment 12a, of the data region is broken, the second unit magnetic segment 12a from the left of the data region 41 is specified on the basis of the optical information provided by the optical fibers 15 of the data region 41, and the information (500 yens) recorded in the specified unit magnetic segment 12a is regarded as the latest information. Then, the read/write head 23 writes the remaining amount to the magnetic card 10.

Referring to FIG. 11 showing a read system employed in carrying out the present invention, the signal representing the magnetic information read by the read/write head 23 and given to the controller 25 is converted into a corresponding digital signal by an A/D converter 35, and the digital signal is given to a comparator 36. The optical information provided by the optical fibers 15 of the maximum available amount determining region 40 among the optical information provided by the light receiving device 22 is given to a maximum available amount calculating unit 38 of the controller 25. The controller 25 has a ROM 37 storing a maximum available amount of, for example, 500 yens. The maximum available amount of 500 yens is given from the ROM 37 to the maximum available amount calculating unit 38. Upon the reception of the optical information of, for example, "1" provided by the optical fibers 15 of the maximum available amount determining region 40, the maximum available amount calculating unit 38 calculates (Reference unit "1")+(Optical information "1")=2, and calculates a maximum available amount of 1000 yens=500 yens×2, using the unit maximum available amount of 500 yens.

Then, the comparator 36 compares the maximum available amount of 1000 yens calculated by the maximum available amount calculating unit 38, and the magnetic information read by the read/write head 23. The magnetic information read by the read/write head 23 ought to be equal to or less than 1000 yens. If the magnetic information recorded in the magnetic stripe 12 is dishonestly altered to a greater amount of money, such as 10,000 yens or 20,000 yens, the dishonest alteration of the magnetic information can surely be detected by the comparator 36 with reliability. If it is found that the magnetic information has dishonestly been altered, the comparator 36 gives a signal to that effect to the host computer.

Fourth Embodiment

Figure 12A:
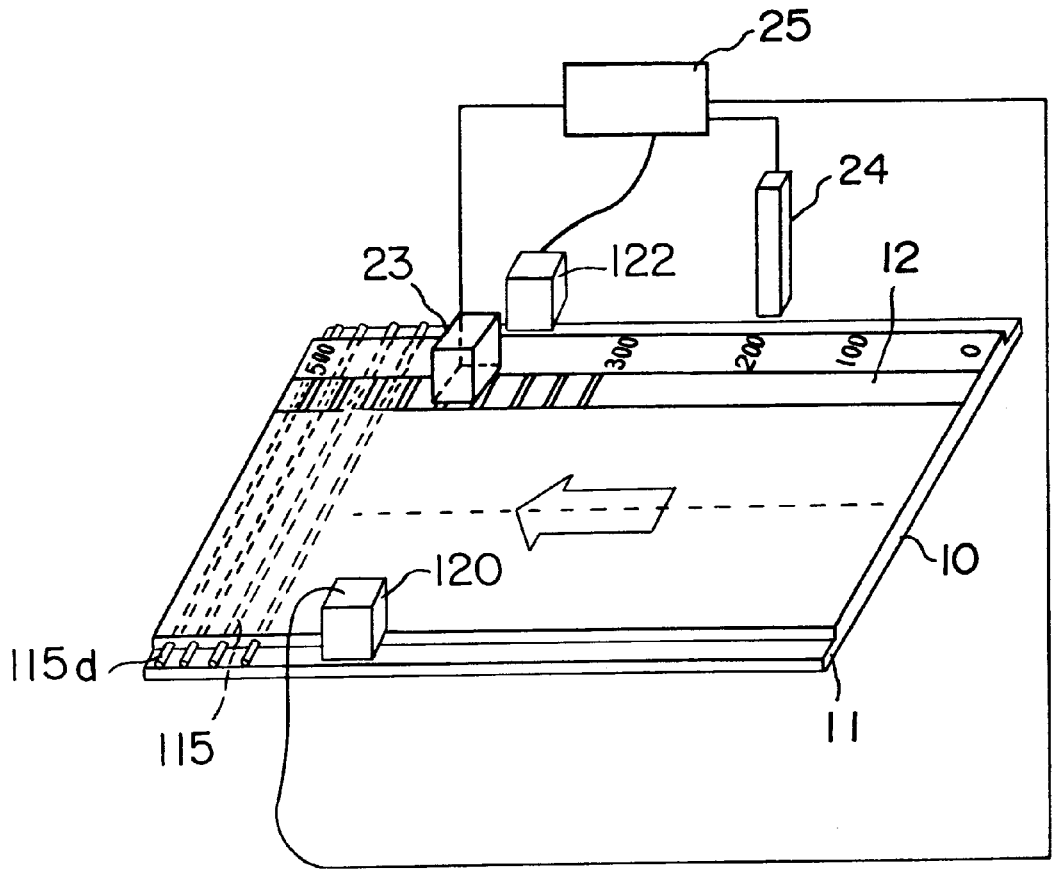
FIG. 12A is a perspective view of a magnetic card in a fourth embodiment according to the present invention.
Figure 12B:
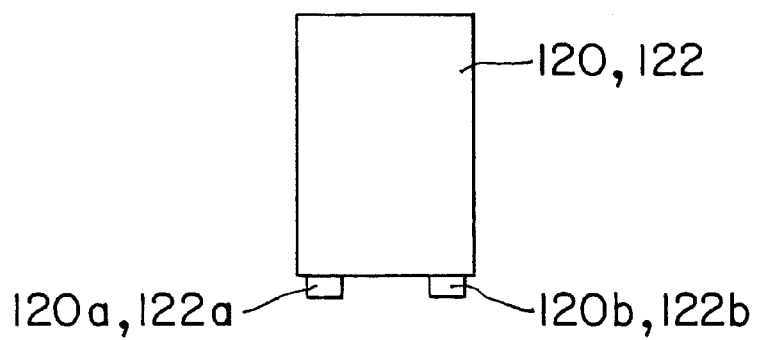
FIG. 12B is a side view of a contact electrode-unit.
Figure 13:
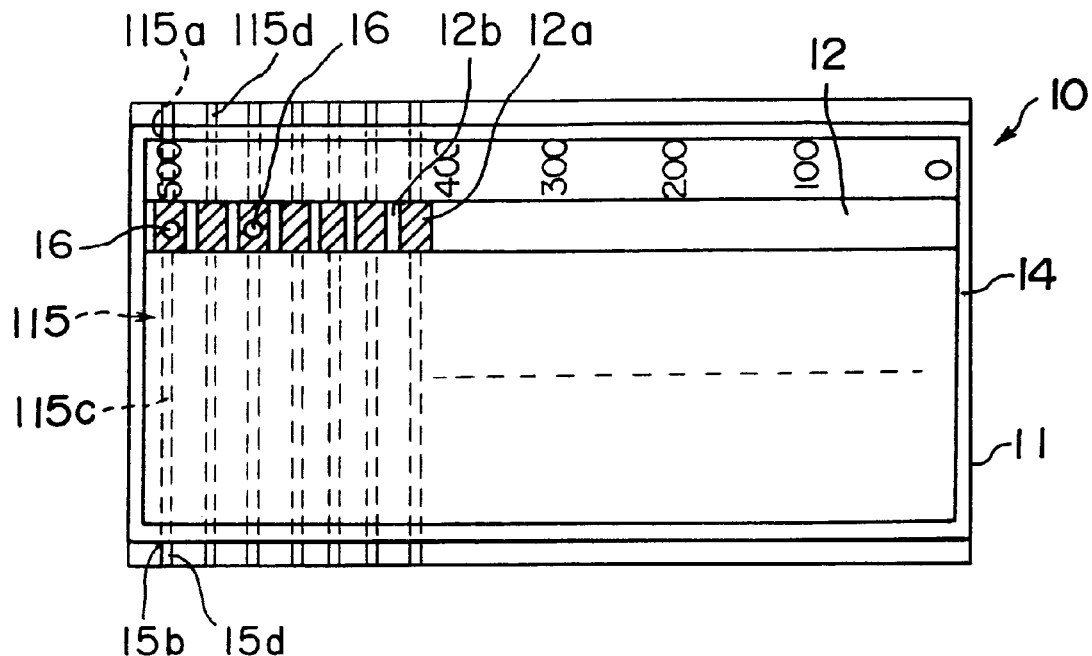
FIG. 13 is a plan view of a magnetic card.
Figure 14:
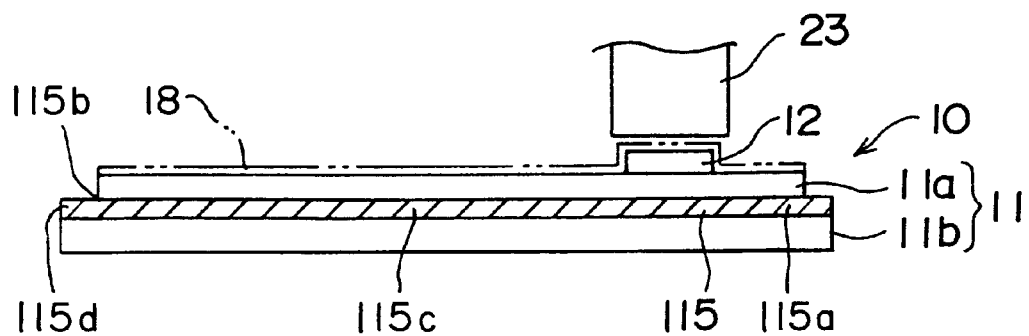
FIG. 14 is a side view of the magnetic card of FIG. 13.

Referring to FIGS. 12A, 12B, 13 and 14 showing a magnetic card 10 in a fourth embodiment according to the present invention, the magnetic card 10 has a rectangular base card 11 formed by putting together a pair of plastic base plates 11a and 11b (FIG. 14), a magnetic stripe 12 printed on the base card 11 so as to extend along a longitudinal direction of the base card 11, and a plurality of conductive rubber lines 115 held between the pair of base plates 11a and 11b. A colored protective film 18 may be applied to the base card 11 so as to cover the entire surface of the base card 11 including the magnetic stripe 12. The base card 11 is formed by putting the base plates 11a and 11b one on top of the other and making the same stick to each other by vacuum and has a narrow peripheral frame 14 formed by adhesively bonding together the corresponding peripheral portions of the base plates 11a and 11b. As shown in FIG. 13, the magnetic stripe 12 has a plurality of unit magnetic segments 12a having a recording capacity of a predetermined number of bits, and spaced from each other by gaps 12b.

The construction of the magnetic stripe 12 will be described on an assumption that the magnetic card 10 a prepaid card for renting balls to play a pinball game. Suppose that the magnetic card 10 is a 50,000-yen prepaid card. Then, the magnetic stripe 12 has 500 unit magnetic segments 12a each being worth 100 yens. Since 256 (nine bits)<500<512 (ten bits) as shown in FIG. 6A, each unit magnetic segment 12a is able to record 500 units when each unit magnetic segment has a recording capacity of nine bits. The relation between the number of bits and the number of recordable units will be described with reference to FIG. 6B. As shown in FIG. 6B, numerical values from 0 to 7 can be expressed by combinations of three bits. In this embodiment, each unit magnetic segment 12a has a storage capacity of eleven bits because one start bit indicating the start of magnetic information and a stop bit indicating the end of the magnetic information are necessary to write the magnetic information of nine bits to each unit magnetic segment 12a. Each unit magnetic segment 12a corresponds to one unit and hence the magnetic stripe 12 has the 500 unit magnetic segments.

Referring to FIG. 13, the 500 conductive rubber lines 115 correspond to the 500 unit magnetic segments 12a, respectively. Each conductive rubber line 115 extends perpendicularly to the magnetic stripe 12 and substantially through the central portion of the corresponding unit magnetic segment 12a. Each conductive rubber line 115 is extended in a slight tension and has opposite end portions 115a and 115b fastened to the peripheral frame 14 of the base card 11, and a middle portion 115c between the opposite end portions 115a and 115b held between and not restrained from movement by the pair of base plates 11a and 11b of the base card 11. If the peripheral frame 14 of the base card 11 is cut off, the base plates 11a and 11b, and the conductive rubber lines 115 come apart. The end portions 115a and 115b have exposed extremities 115d extending outward beyond the long sides of the narrower base plate 11a to the long sides of the wider base plates 11b as shown in FIG. 12A. A pair of contact units 120 and 122 are disposed so as to come into contact with the exposed extremities 115d, respectively.

The opposite end portions 115a and 115b of the conductive rubber lines 115, fastened to the peripheral frame 14 of the base card 11 are arranged at regular intervals, while the middle portions 115c between the opposite end portions 115a and 115b are pulled taut in a tension. If a through hole 16 is formed through the unit magnetic segment 12a and the conductive rubber line 115, the conductive rubber line 115 is broken by the through hole 16 and the broken pieces of the conductive rubber line 115 shrink toward the opposite end portions 115a and 115b, respectively.

A read/write system for reading magnetic information from and writing magnetic information to the magnetic card 10 and for reading electric information from the magnetic card 10 will be described hereinafter. Referring to FIGS. 12A and 12B, the magnetic card 10 is advanced in the direction of the arrow L to read magnetic information from and to write magnetic information to the magnetic stripe 12 of the magnetic card 10 by a read/write head 23 connected to a controller 25.

As shown in FIG. 12A, a pair of contact units 120 and 122 having electrodes to be brought into contact with the opposite exposed extremities 115d of each conductive rubber line 115, respectively, are disposed at positions corresponding to the long sides of the magnetic card 10. The pair of contact units 120 and 122 are connected to the controller 25. As shown in FIG. 12B, the contact unit 120 is provided with a pair of electrodes 120a and 12b, the contact unit 122 is provided with a pair of electrodes 122a and 122b. The electrode 120a of the contact unit 120 and the electrode 122a of the contact unit 122 are used to authenticate the electrical connection of the opposite extremities 115d of each conductive rubber line 115. The dishonest electrical connection of the respective exposed extremities 115d of the adjacent conductive rubber lines 115, exposed on the same side of the magnetic card 10 can be detected by bringing the electrodes 120a and 120b of the contact unit 120 or the electrodes 122a and 122b of the contact unit 122 into contact with the exposed extremities 115d of the adjacent conductive rubber lines 115. As shown in FIG. 12A, a punching device 24 is disposed so that the magnetic stripe 12 of the magnetic card 10 moves under the punching device 24. The punching device 24 punches the magnetic card 10 to form a through hole 16 through the unit magnetic segment 12a and the conductive rubber line 15. The through hole 16 may be formed by melting a portion of the magnetic card 10.

A method of using the magnetic card 10 will be described hereinafter on an assumption that the magnetic card 10 is used as a prepaid card for renting balls to play a pinball game.

First, magnetic information representing 50,000 yens, i.e., 500 units each of 100 yens, for renting balls to play a pinball game is recorded in the leftmost unit magnetic segment 12a, as viewed in FIG. 13, of the magnetic stripe 12 of the magnetic card 10. Suppose that balls which are worth, for example, 100 yens are to be rented by using the magnetic card 10. As the magnetic card 10 is advanced in the direction of the arrow L (FIG. 12A), the read/write head 23 reads the magnetic information from the magnetic stripe 12 and sends a signal representing the read magnetic information to the controller 25. Meanwhile, a current is supplied to each conductive rubber line 115 by the pair of contact units 120 and 122 by bringing the respective electrodes 120a and 122a of the contact units 120 and 122 into contact with the opposite exposed extremities 115d of each conductive rubber line 115, respectively. At the same time, the electrodes 120a and 120b of the contact unit 120 are brought into contact with the exposed extremities 115d of the adjacent conductive rubber lines 115 on one side of the magnetic card 10, and the electrodes 122a and 122b of the contact unit 122 are brought into contact with the exposed extremities 115d of the adjacent conductive rubber lines 115 on the other side of the magnetic card 10 to detect the dishonest connection of the adjacent exposed extremities 115d. The contact units 120 and 122 give electrical information representing the condition of the conductive rubber lines 115 to the controller 25. When the controller 25 receives electrical information indicating that all the conductive rubber lines are continuous, the controller 25 specifies the leftmost unit magnetic segment 12a in which the magnetic information is recorded, and determines that the magnetic information recorded in the specified unit magnetic segment 12a and representing 500 units is the latest magnetic information through the authentication of the magnetic information with reference to the electrical information.

Suppose that the magnetic card 10 is used for renting ball which are worth 100 yens (one unit). Then, the magnetic card is moved in a direction opposite the direction of the arrow L and new magnetic information representing 499 units (=500−1) is recorded in the second unit magnetic segment 12a from the left as viewed in FIG. 13.

The controller 25 drives the punching device 24 to punch (pierce) the leftmost unit magnetic segment 12a on the left side of the second unit magnetic segment 12a so that corresponding portions of the base card 11, the leftmost unit magnetic segment 12a and the conductive rubber line 15 are punched out to form a through hole 16. Then, the controller 25 drives the read/write head 23 to record the new magnetic information representing 499 units in the second unit magnetic segment 12a from the left to update the magnetic card 10.

Suppose that the magnetic card 10 is used again to rent additional balls which are worth 200 yens. The magnetic card 10 is advanced in the direction of the arrow L (FIG. 12A), and the read/write head 23 reads the magnetic information recorded in the magnetic stripe 12 and sends a signal representing the magnetic information read from the magnetic stripe 12 to the controller 25. Meanwhile, the pair of contact units 120 and 122 supply a current through each conductive rubber line 115. Electrical information representing the condition of the conductive rubber lines 115 is sent to the controller 25. Since the conductive rubber line 115 corresponding to the leftmost unit magnetic segment 12a (FIG. 13) is broken by the through hole 16, the broken pieces of the conductive rubber line 115 shrink elastically toward the opposite end portions 115a and 115b, respectively. Since the conductive rubber line 115 is broken, the pair of contact units 120 and 122 are electrically disconnected from each other, and the controller 25 detects the breakage of the conductive rubber line 115 on the basis of the electric signals provided by the pair of contact units 120 and 122. Then, the controller 25 determines that the magnetic information representing 499 units and recorded in the second unit magnetic segment 12a from the left is the latest magnetic information through the authentication of the magnetic information with reference to the electrical information.

When the magnetic card 10 is used further to rent balls which are worth 200 yens (two units), the magnetic card 10 is moved in a direction opposite the direction of the arrow L and new magnetic information representing 497 units (=499−2) is recorded in the fourth unit magnetic segment 12a from the left as viewed in FIG. 13. In this case, the controller 25 drives the punching device 24 to punch the third unit magnetic segment 12a on the left side of the fourth unit magnetic segment 12a so that corresponding portions of the base card 11, the third unit magnetic segment 12a and the conductive rubber line 15 are punched out to form a through hole 16. Then, the controller 25 drives the read/write head 23 to record the new magnetic information representing 497 units in the fourth unit magnetic segment 12a from the left to update the magnetic card 10.

Similarly, the magnetic information and the electrical information are read from the unit magnetic segment 12a and the conductive rubber line 115 of the magnetic card 10, the base card 11 and the conductive rubber line 115 of the magnetic card 10 are punched to form a through hole 16, and new magnetic information is recorded in the unit magnetic segment 12a to update the magnetic card 10. The new magnetic information may be recorded before forming the through hole 16.

The through hole 16 formed by the punching device 24 may be of any suitable shape, such as a circular through hole (FIG. 13), a pentagonal through hole (FIG. 5A) or a triangular through hole (FIG. 5B).

Dishonest methods of using the magnetic card 10 will be described hereinafter.

A possible dishonest method of using the magnetic card 10 attaches a magnetic tape 19 adhesively to a portion of the magnetic card 10 corresponding to the magnetic stripe 12 and records new magnetic information in the magnetic tape 19 as shown in FIGS. 4A and 4B. In the magnetic card 10 of the present invention, the magnetic stripe 12 has the unit magnetic segments 12a and the gaps 12b. Therefore, a voltage signal representing the magnetic information read from the magnetic stripe 12 has a waveform having elevated sections corresponding to the unit magnetic segments 12a, and low sections corresponding to white noise generated by the gaps 12b as shown in FIG. 4A. If the magnetic tape 19 is attached adhesively to the portion of the magnetic card 10 corresponding to the magnetic stripe 12, a voltage signal representing the magnetic information read from the magnetic tape 12 has low sections corresponding to white noise generated by the gaps 12b, and elevated sections corresponding to the unit magnetic segments 12a and having a curved shape more gentle than that of the elevated sections corresponding to the unit magnetic segments 12a of the magnetic card 10 to which the magnetic tape 19 is not attached. Therefore, the magnetic tape 19 dishonestly attached to the magnetic card 10 can be detected through the detection of a change in the waveform of the voltage signal representing the magnetic information. The gaps 12b can be concealed by coating the surface of the base card 11 entirely with a colored protective film 18.

Another possible dishonest method of using the magnetic card 10 punches a hole in a portion of the base card 11 lying inside the peripheral frame 14 and including the through hole 16, and fits a plugging chip including a conductive rubber line in the hole. However, if a portion of the base card 11 is punched, the conductive rubber line 115 held between the base plates 11a and 11b is broken into to broken pieces and the broken pieces shrink toward the opposite end portions 115a and 115b, respectively, because the conductive rubber line 115 is extended taut in a slight tension and the base card 11 is formed by putting the base plates 11a and 11b one on top of the other and making the same stick to each other by vacuum, and hence the broken ends of the broken pieces of the conductive rubber line 115 disappear from the edge of the through hole 16. Therefore it is very difficult to fit the plugging chip in the punched hole with the opposite ends of the conductive rubber line included therein coinciding with the broken ends of the conductive rubber line 115 of the magnetic card 10.

Another possible dishonest method of using the magnetic card 10 attaches conductive films, such as copper foils, to the magnetic card 10 across one of the extremities 115d of the broken conductive rubber line 115 and one of the extremities 115d of the adjacent conductive rubber line 115 on one of the opposite sides of the base card 11, and across the other extremity 115d of the broken conductive rubber line 115 and the other extremity 115d of the adjacent conductive rubber line 115 on the other side of the base card 11 to make the broken conductive rubber line 115 appear as if it were not broken. However, if such a dishonest method is applied to the magnetic card 10, a current flows across the electrodes 120a and 120b of the contact unit 120, and a current flows across the electrodes 122a and 122b of the contact unit 122, whereby the dishonest use of the magnetic card 10 can be detected.

A third possible dishonest method of using the magnetic card 10 attaches conductive films to the magnetic card 10 across one of the extremities 115d of the broken conductive rubber line 115 and one of the extremities 115d of the conductive rubber line 115 after next on one of the opposite sides of the base card 11, and across the other extremity 115d of the broken conductive rubber line 115 and the other extremity 115d of the conductive rubber line 115 after next on the other side of the base card 11 to make the broken conductive rubber line 115 appear as if it were not broken. In this case, the extremities 115d of the next conductive rubber line 115 must be covered with insulating covers, and hence the contact units 120 and 122 are unable to supply a current through the next conductive rubber line 115 and the next conductive rubber line 115 appears as if it were broken.

Thus, the magnetic card 10 in the fourth embodiment is capable of effectively preventing the dishonest use thereof and the dishonest alteration of the magnetic information recorded therein.

Fifth Embodiment

Figure 15:
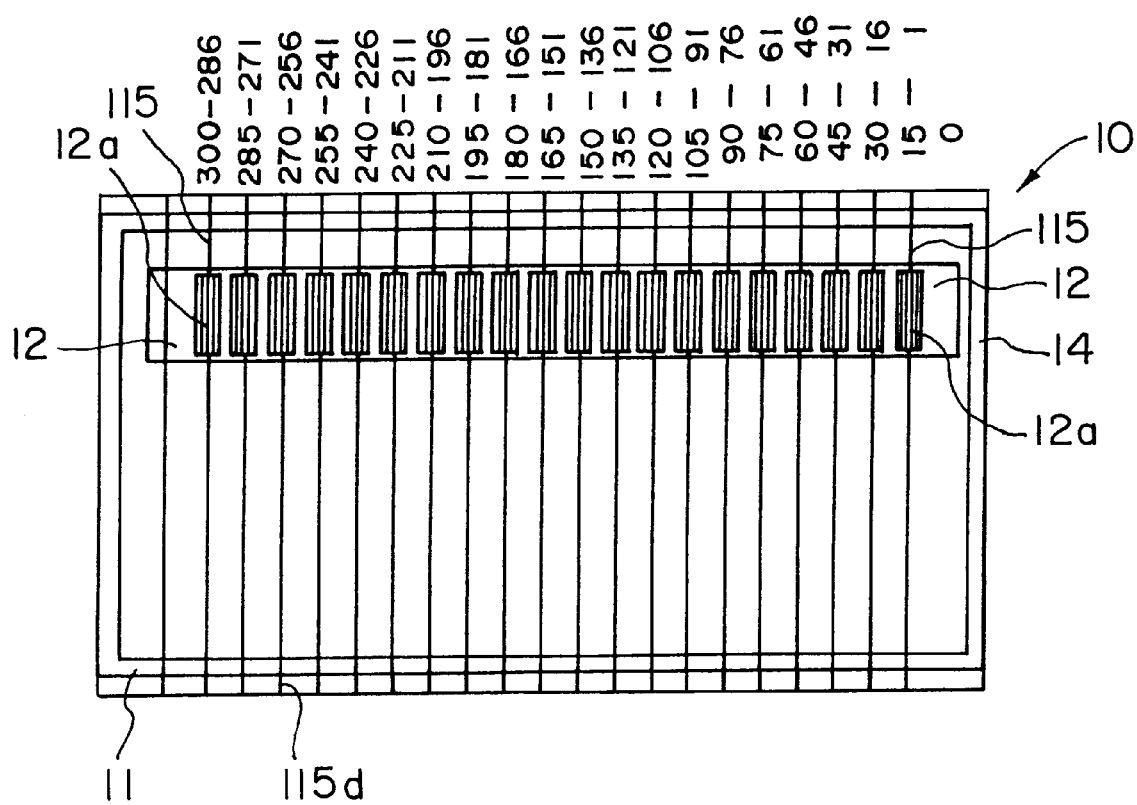
FIG. 15 is a plan view of a magnetic card in a fifth embodiment according to the present invention.

A magnetic card 10 in a fifth embodiment according to the present invention will be described with reference to FIG. 15, in which parts like or corresponding to those of the magnetic card 10 in the fourth embodiment shown in FIGS. 12A to 14 are designated by the same reference characters and the description thereof will be omitted. The magnetic card 10 in the fifth embodiment differs from the magnetic card 10 in the fourth embodiment only in the construction of its magnetic stripe 12. In FIG. 15, conductive rubber lines 115 which are covered and concealed by a base plate are indicated by continuous lines for convenience.

Suppose that the magnetic card 10 is a 30,000-yen prepaid card for renting balls to play a pinball game. The amount of 30,000 yens is equivalent to 300 units each of 100 yens. Since 256 (nine bits)<300<512 (ten bits), each unit magnetic segment 12a is able to record 300 units when each unit magnetic segment has a recording capacity of nine bits. In this embodiment, each unit magnetic segment 12a has a storage capacity of eleven bits including one start bit indicating the start of magnetic information and a stop bit indicating the end of the magnetic information. Each unit magnetic segment 12a corresponds to fifteen units and hence the magnetic stripe 12 has twenty unit magnetic segments 12a (300/15=20).

As shown in FIG. 15, the magnetic card 10 is provided with twenty-one conductive rubber lines 115; twenty conductive rubber lines 115 respectively in combination with the twenty unit magnetic segments 12a, and one conductive rubber line 115 on the left side of the leftmost unit magnetic segment 12a, as viewed in FIG. 15.

Magnetic information representing 300 units, i.e., 30,000 yens, is recorded in the leftmost unit magnetic segment 12a of the magnetic card 10. If the magnetic card 10 is used and the number of the remaining units is in the range of 286 to 299, the conductive rubber line 115 combined with the leftmost unit magnetic segment 12a is broken and magnetic information representing the number of the remaining units is recorded in the leftmost unit magnetic segment 12a. As the magnetic card 10 is used and the number of the remaining units is in the range of 241 to 255, magnetic information representing the number of the remaining units in the fourth unit magnetic segment 12a from the left, the next unit magnetic segment 12a on the left side of the fourth unit magnetic segment 12a is punched and the conductive rubber line 115 combined with the same punched unit magnetic segment 12a is broken.

As is apparent from the foregoing description, the magnetic card of the present invention is capable of effectively prohibiting the dishonest alteration of the magnetic information recorded therein and of surely detecting the dishonest use thereof. Therefore, when used as a prepaid card, such as a prepaid card for renting ball to play a pinball game, the magnetic card of the present invention prevents monetary damage to the financing firm who issued the magnetic card.

What is claimed is:

1. An information recording card comprising:
    a base card;
    an information recording unit provided in the base card, the information recording unit having a magnetic stripe with a plurality of unit magnetic segments each having a predetermined storage capacity; and
    a plurality of optical waveguides comprising light-transmitting tunnels formed in the base card, the plurality of optical waveguides disposed so as to correspond to the unit magnetic segments, respectively.

2. The information recording card according to claim 1, wherein
    the optical waveguides meander.

3. The information recording card according to claim 1, wherein
    a through hole is formed at a position on the base card corresponding to a unit magnetic segment of the magnetic stripe so as to pass through the unit magnetic segment and the optical waveguide corresponding to the unit magnetic segment.

4. The information recording card according to claim 1, wherein
    a recess is formed at a position on the base card corresponding to a unit magnetic segment of the magnetic stripe so as to deform the unit magnetic segment and the optical waveguide corresponding to the unit magnetic segment by compression.

5. The information recording card according to claim 1, wherein
    the optical waveguides are optical fibers.

6. The information recording card according to claim 5, wherein
    the base card comprises a pair of base plates, the pair of base plates are put one over the other and joined together by vacuum compression, the respective peripheral portions of the base plates are bonded together to form a peripheral frame, and the opposite end portions of the optical fibers are fastened to the peripheral frame.

7. The information recording card according to claim 1, wherein
    the information recording unit comprises an IC module.

8. An information recording card comprising:
    a base card having a pair of base plates put one over the other and joined together by vacuum compression, and respective peripheral portions of the base plates bonded together to form a peripheral frame;

an information recording unit provided in the base card; and, a plurality of optical waveguides comprising light-transmitting tunnels formed in the base card.

9. A card comprising:

a base card having a pair of base plates put one over the other and joined together by vacuum compression, the respective peripheral portions of the base plates bonded together to form a peripheral frame; and a plurality of optical waveguides comprising light-transmitting tunnels formed in the base card.

10. A card comprising:

a base card; and, a plurality of optical waveguides comprising light-transmitting tunnels formed in the base card, wherein a through hole is formed at a position on the base card so as to pierce the optical waveguide after information is read from light transmitted by said optical waveguide.

11. The card according to claim 10, wherein the optical waveguides are optical fibers.

12. The card according to claim 11, wherein the base card comprises a pair of base plates, the pair of base plates are put one over the other and joined together by vacuum compression, the respective peripheral portions of the base plates are bonded together to form a peripheral frame, and the opposite end portions of the optical fibers are fastened to the peripheral frame.

13. A card comprising:

a base card;

a plurality of optical waveguides comprising light-transmitting tunnels formed in the base card; and, a recess formed at a position on the base card so as to deform the optical waveguide after information is read from light transmitted by said optical waveguide.

14. A method of using an information recording card comprising a base card, and an information recording unit provided in the base card; said method comprising the steps of:

providing a plurality of optical waveguides comprising light-transmitting tunnels formed in the base card;

reading information recorded in the information recording unit by a read device;

reading optical information by projecting a light beam by a light-emitting device on the optical waveguides and receiving the light beam by a light receiving device;

specifying a part of the information recording unit in which the information is recorded on the basis of the optical information; and, examining the information read from the part of the information recording unit with reference to the optical information to authenticate the information recording card.

15. The method according to claim 14, further comprising:

a step of writing new information to the information recording unit by a write device to update the information recording card, and breaking the optical waveguide corresponding to the new information.

16. The method according to claim 15, wherein the step of breaking the optical guide is forming a through hole through a portion of the base card and the optical waveguide.

17. The method according to claim 15, wherein the step of breaking the optical guide is deforming corresponding portions of the base card and the optical waveguide by compression.

18. A method of using an information recording card comprising a base card, and an information recording unit provided in the base card, said method comprising the steps of:

providing a plurality of optical waveguides comprising light-transmitting tunnels formed in the base card;

setting a maximum available amount determining region in the plurality of optical waveguides and determining a maximum available amount by breaking the optical waveguide in the maximum available amount determining region;

reading information recorded in the information recording unit by a read device;

reading optical information by projecting a light beam on the optical waveguides by a light-emitting device and receiving the light beam by a light receiving device; and comparing the information read from the information recording unit with the maximum available amount indicated by the optical information read from the maximum available amount determining region to see if the information read from the information recording unit exceeds the maximum available amount.

19. The method according to claim 18 further comprising:

a step of setting a data region in the plurality of optical waveguides, and examining the information read from the information recording unit with reference to the optical information read from the data region to authenticate the same.

20. A method of using an information recording card comprising a base card, an information recording unit provided in the base card and provided with a magnetic stripe having a plurality of unit magnetic segments each having a recording capacity of a predetermined; bits, said method comprising the steps of:

providing a plurality of optical waveguides comprising light-transmitting tunnels formed in the base card and disposed at positions corresponding to the unit magnetic segments:

reading information recorded in the unit magnetic segment of the magnetic stripe by a read device and reading optical information by projecting a light beam by a light-emitting device on the optical waveguides and receiving the light beam by a light receiving device; and specifying the unit magnetic segment in which the information is recorded on the basis of the read optical information and determining the information stored in the specified unit magnetic segment as the latest information.

21. The method according to claim 20, further comprising:

the steps of writing the new information to the unit magnetic segment corresponding to the new information among the plurality of unit magnetic segments by a write device, and breaking the optical waveguide combined with the unit magnetic segment separated by a predetermined number of unit magnetic segments from the unit magnetic segment to which the new information is written.

22. The method according to claim 21, wherein the step of breaking the optical waveguide is forming a through hole through a portion of the base card and the optical waveguide.

23. The method according to claim 21, wherein
the step of breaking the optical waveguide is deforming a portion of the base card and the optical waveguide by compression.

24. A method of using an information recording card comprising a base card, an information recording unit provided in the base card and provided with a magnetic stripe having a plurality of unit magnetic segments each having a recording capacity of predetermined bits said method comprising steps of:

providing a plurality of optical waveguides comprising light-emitting tunnels in the base card and disposed at positions corresponding to the unit magnetic segments, setting a maximum available amount determining region in the plurality of optical waveguides and determining a maximum available amount by breaking the optical waveguide in the maximum available amount determining region;

reading information recorded in the unit magnetic segment of the magnetic stripe by a read device, and reading optical information by projecting a light beam on the optical waveguides by a light-emitting device and receiving the light beam by a light receiving device;

comparing the information read by the read device with a maximum available amount indicated by optical information read from the maximum available amount determining region to see if the information read by the read device exceeds the maximum available amount.

25. A method of using an information recording card comprising a base card, an information recording unit provided in the base card and provided with a magnetic stripe having a plurality of unit magnetic segments each having a recording capacity of a predetermined bits, said method comprising steps of:

a plurality of optical waveguides comprising light-emitting tunnels in the base card and disposed at positions corresponding to the unit magnetic segments, dividing the plurality of optical waveguides into those included in a maximum available amount determining region and those included in a data region, and determining a maximum available amount by breaking the optical waveguide in the maximum available amount determining region;

reading information recorded in the unit magnetic segment of the magnetic stripe by a read device, and reading optical information by projecting a light beam on the optical waveguides by a light-emitting device and receiving the light beam by a light receiving device;

specifying the unit magnetic segment in which the information is recorded on the basis of optical information obtained from the data region and determining the information recorded in the specified unit magnetic segment as the latest information; and comparing the latest information with the maximum available amount indicated by optical information read from the maximum available amount determining region to see if the latest information exceeds the maximum available amount.

26. The method according to claim 25 further comprising the steps of writing the new information to the unit magnetic segment corresponding to the new information among the plurality of unit magnetic segments by a write device, and breaking the optical waveguide combined with the unit magnetic segment separated by a predetermined number of unit magnetic segments from the unit magnetic segment to which the new information is written.

27. A method of using a card comprising a base card, said method comprising the steps of:

providing a plurality of optical waveguides comprising light-transmitting tunnels formed in the base card;

reading optical information from the card by projecting a light beam on the optical waveguides by a light-emitting device; and breaking a desired optical waveguide after the step of reading optical information from the card.

28. The method according to claim 27, wherein
the step of breaking the optical waveguide is forming a through hole through a portion of the base card and the optical waveguide.

29. The method according to claim 27, wherein
the step of breaking the optical waveguide is deforming a portion of the base card and the optical waveguide by compression.

30. An information read system for reading information from an information recording card comprising a base card, an information recording unit provided in the base card, said information read system comprising:

a plurality of optical waveguides comprising light-transmitting tunnels provided in the base card and including at least those in a maximum available amount determining region, a light-emitting device for projecting a light beam on the optical waveguides included in the maximum available amount determining region;

a light receiving device for receiving the light beam to read optical information from the maximum available amount determining region;

a read device for reading information recorded in the information recording unit; and a controller connected to the light-emitting device, the light receiving device and the read device;

wherein the controller comprises a ROM storing a unit maximum available amount, a maximum available amount calculating unit which determines a maximum available amount on the basis of the optical information provided by the light receiving device and the unit maximum available amount read from the ROM, and a comparing unit which compares the maximum available amount calculated by the maximum available amount calculating unit and the information read by the read device.

31. A magnetic card comprising:

a rectangular base card, a magnetic stripe provided in the base card, the magnetic stripe having a plurality of unit magnetic segments each having a recording capacity of a predetermined number of bits, and a plurality of conductive rubber lines extended within the base card substantially perpendicularly to the magnetic stripe, the conductive rubber lines disposed to correspond to the unit magnetic segments, respectively.

32. The magnetic card according to claim 31, wherein
a through hole is formed in the base card at a position in the unit magnetic segment of the magnetic stripe so as to pierce the unit magnetic segment and the conductive rubber line corresponding to the unit magnetic segment.

33. A magnetic card comprising:
a rectangular base card, the base card having a pair of base plates put one over the other and joined together by vacuum compression, and respective peripheral portions of the base plates bonded together to form a peripheral frame;
a magnetic stripe provided in the base card; and
a plurality of conductive rubber lines extended within the base card substantially perpendicularly to the magnetic stripe.

34. The magnetic card according to claim 33, wherein opposite end portions of the conductive rubber lines are fastened to the peripheral frame.

35. The magnetic card according to claim 34, wherein extremities of the opposite end portions of each conductive rubber line project from opposite side edges of one of the base plates and lie on opposite side portions of the other base plate, respectively.

36. A card comprising:
a rectangular base card having a pair of base plates put one over the other and joined together by vacuum compression, and respective peripheral portions of the base plates bonded together to form a peripheral frame; and
a plurality of conductive rubber lines extended within the base card.

37. The card according to claim 36, wherein opposite end portions of the conductive rubber lines are fastened to the peripheral frame.

38. The card according to claim 37, wherein extremities of the opposite end portions of each conductive rubber line project from opposite side edges of one of the base plates and lie on opposite side portions of the other base plate, respectively.

39. A card comprising:
a rectangular base card;
a plurality of conductive rubber lines extended within the base card; and
a through hole formed in the base card so as to pierce the conductive rubber line after information is read from light transmitted by said conductive rubber line.

40. A method of using a magnetic card comprising: a rectangular base card, a magnetic stripe provided in the base card, and a plurality of conductive rubber lines extended within the base card substantially perpendicularly to the magnetic stripe; said method comprising steps of:
reading magnetic information recorded in the magnetic stripe by a read head and supplying a current to the conductive rubber lines by a pair of contact units to read electrical information, wherein the pair of contact units are brought into electrical contact with extremities of opposite end portions of a desired one of the conductive rubber lines, when reading electrical information by supplying a current to the same conductive rubber line by means of the pair of contact units, to confirm the continuity of the same conductive rubber line and, at the same time, one of the pair of contact units finds whether or not one of the extremities of the desired conductive rubber line and one of the extremities of the adjacent conductive rubber line on one of the opposite sides of the base card are electrically connected, and the other contact unit finds whether or not the other extremity of the desired conductive rubber line and the other extremity of the adjacent conductive rubber line on the other side of the base card are electrically connected;
examining the read magnetic information with reference to the electrical information to authenticate the same; and
writing new magnetic information to the magnetic stripe by a write head and forming a through hole through corresponding portions of the base card and the conductive rubber line combined with the new magnetic information.

41. A method of using a magnetic card comprising a rectangular base card, a magnetic stripe provided in the base card and having a plurality of unit magnetic segments each having a recording capacity of a predetermined number of bits, and a plurality of conductive rubber lines extended within the base card substantially perpendicularly to the magnetic stripe and disposed so as to correspond to the unit magnetic segments, respectively, said method comprising steps of:
reading magnetic information recorded in the unit magnetic segment of the magnetic stripe by a read head and supplying a current to the conductive rubber lines by a pair of contact units to read electrical information, wherein the pair of contact units are brought into electrical contact with extremities of opposite end portions of a desired one of the conductive rubber lines, when reading electrical information by supplying a current to the same conductive rubber line by means of the pair of contact units, to confirm the continuity of the same conductive rubber line and, at the same time, one of the pair of contact units finds whether or not one of the extremities of the desired conductive rubber line and one of the extremities of the adjacent conductive rubber line on one of the opposite sides of the base card are electrically connected, and the other contact unit finds whether or not the other extremity of the desired conductive rubber line and the other extremity of the adjacent conductive rubber line on the other side of the base card are electrically connected;
specifying the unit magnetic segment in which the magnetic information is recorded on the basis of the read electrical information, and determining the magnetic information recorded in the specified unit magnetic segment as new magnetic information; and
writing the new magnetic information to the unit magnetic segment corresponding to the latest magnetic information among those of the magnetic stripe by a write head, and forming a through hole through corresponding portions of the base card and the conductive rubber line of the unit magnetic segment separated by a predetermined number of unit magnetic segments from the unit magnetic segment to which the new electrical information is written.

42. A method of using a card comprising a rectangular base card, and a plurality of conductive rubber lines extended within the base card, said method comprising steps of:
reading electrical information by supplying a current to the conductive rubber lines by a pair of contact units, the pair of contact units are brought into electrical contact with extremities of opposite end portions of a desired one of the conductive rubber lines, when reading electrical information by supplying a current to the same conductive rubber line by means of the pair of contact units, to confirm the continuity of the same conductive rubber line and, at the same time, one of the pair of contact units finds whether or not one of the extremities of the desired conductive rubber line and one of the extremities of the adjacent conductive rubber line on one of the opposite sides of the base card are electrically connected, and the other contact unit finds whether or not the other extremity of the desired conductive rubber line and the other extremity of the adjacent conductive rubber line on the other side of the base card are electrically connected; and writing new electrical information to the card by forming a through hole through corresponding portions of the base card and the desired one of the conductive rubber line.

* * * * *